F. J. JOHANSSON & E. A. O. GÖTHE.
MILKING MACHINE.
APPLICATION FILED JAN. 26, 1910.
974,277.
Patented Nov. 1, 1910.
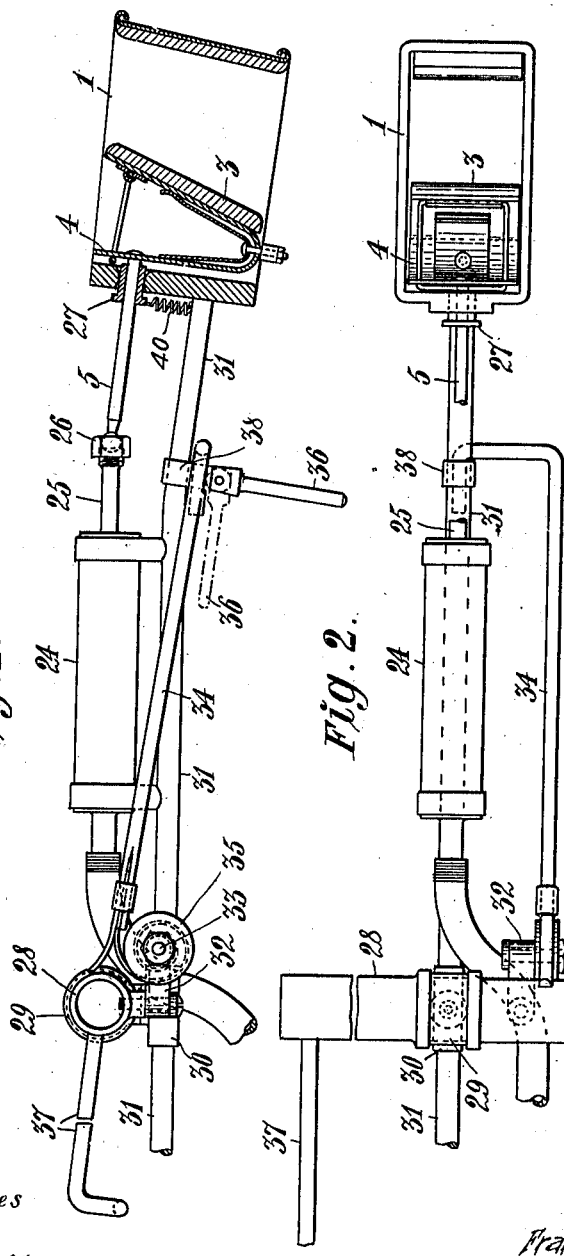
Witnesses
J. S. Freeman
Ruth Stockman.
Inventors
Frans Josef Johansson and
Emil Albert Olson Göthe.
By B. Singer,
Attorney.

UNITED STATES PATENT OFFICE.

FRANS JOSEF JOHANSSON AND EMIL ALBERT OLSON GÖTHE, OF STOCKHOLM, SWEDEN.

MILKING-MACHINE.

974,277.

Specification of Letters Patent.

Patented Nov. 1, 1910.

Application filed January 26, 1910. Serial No. 540,128.

*To all whom it may concern:*

Be it known that we, FRANS JOSEF JOHANSSON and EMIL ALBERT OLSON GÖTHE, subjects of the King of Sweden, residing at Stockholm, in the Kingdom of Sweden, have invented new and useful Improvements in Milking-Machines, of which the following is a specification, reference being had to the drawing accompanying and forming a part hereof.

This invention relates to milking machines and particularly to mechanisms for transmitting motion from the driving apparatus, for instance a pulsator, to the clamping devices operating the teats.

The invention is particularly applicable to milking machines in which the teat-operating parts consist of plates or the like held by the action of springs in such oblique positions as to first clamp the teats at the roots thereof and thereupon successively swing about their upper edges for exposing each separate teat to a downward proceeding pressure. It is, however, to be noted that the invention is not limited to such milking machines, but it may be combined with clamping members of any other suitable kind.

The chief object of the invention is to cause the clamping members to move in such a manner as to exert not only a pressing action but at the same time a downward pulling action on the teats.

A further object of the invention is to cause the teat cups to automatically adjust themselves relatively to the teats according as the udder is emptied.

Further objects will hereinafter appear.

The invention consists, chiefly, in the clamping members being operated by a reciprocating part guided in such a manner as to swing vertically when the clamping member is pressed onto the teat so that the clamping member, after having shut off a quantity of milk in the teat, will press out the said quantity of milk and at the same time exert a slightly pulling action on the teat by which the milking operation is facilitated.

The invention further comprises means for automatically adjusting the clamping members both vertically and laterally during milking.

The invention further comprises the construction and combination of parts hereinafter more particularly described.

In the drawing, Figure 1 is a sectional elevation of a milking device and means for transmitting motion thereto according to the preferred embodiment of our invention. Fig. 2 is a plan view of the same device. Fig. 3 is an end view thereof, viewed from the lefthand side of Fig. 2. Fig. 4 is a central cross-section of Fig. 3.

Referring to the drawing, the clamping member consists of a plate 3 attached to one shank of a V-shaped spring 4 attached to the motion-transmitting means. In the embodiment shown said means consists of a cylinder 24 connected to a pressure conduit and having a working piston whose piston rod 25 is connected through a ball-joint 26 or otherwise to a link or rod 5 carrying the clamping plate 3.

As shown in Fig. 1, the piston rod 25 and the actuating rod 5 are not in alinement with each other, but the said rods are connected and guided in such a manner that the piston rod 25, in moving toward the teat, causes the actuating rod 5 to move longitudinally and at the same time swing vertically so that the clamping plate 3, after having clamped the teat at the root, will exert a downward pulling action thereon. Surrounding the rod 5 and serving as a guide therefor is a sleeve 27 placed in the wall of the teat cup 1 in such a manner as to be able to swing therein a small angle in vertical direction. Connected to the sleeve 27 is a spring 40 tending to pull the outer end of the sleeve downward by which the clamping plate will be kept in a raised position during its movement toward the teat until it meets the same. The clamping member will thus be prevented from sinking by its own weight and will always clamp the teat at one and the same place thereof.

The supporting device for all the milking devices consists of a cross-bar 28 carrying a number of sleeves 29, one for each milking device. These sleeves are loose on the cross-bar so as to be able to turn thereon. Placed at one side of each sleeve 29 in such a manner as to be able to swing about an axis at right angles to the axis of the cross-bar is a second sleeve 30, and extending through the said sleeve is the rod 31 carrying the teat cup 1. Pivotally connected to the cross-bar 28 so as to be able to swing laterally is a part 32, and journaled in the said part is a pin 33. Placed about the said pin so as to be able to swing about the same is a bar 34 elastically supported by a spiral spring 35 placed between the said bar and the pin 33. The spring 35 tends to swing the bar 34 upward, and the said bar in its turn supports the milking device, the outer end of the bar 34 being connected to a sleeve 38 surrounding the rod 31 and adapted to be adjusted in position along the same. The sleeve 38 is provided with a clamping device, such as an eccentric or the like. When the eccentric is loosened, the rod 31 is free to be slid through the sleeve by which the milking device may be adjusted relatively to the cross-bar 28.

It appears from the aforesaid that during the whole milking operation the milking device is adapted to swing freely laterally and vertically and is always pressed upward against the udder.

The machine may be suspended in any suitable manner, for instance by a girt attached to the cross-bar 28, and the machine may be further supported by a forwardly extending part 37 bearing on the belly of the cow.

We claim:

1. In a milking machine, the combination of a reciprocating part, a rod swingably connected to the said reciprocating part, a clamping member carried by the said rod, and a guide for the said rod causing the same to move in such a manner that the clamping member will exert a pulling action on the teat while pressing thereon, substantially as and for the purpose set forth.

2. In a milking machine, the combination of a cylinder, a piston movable in the said cylinder, a piston rod, a rod swingably connected to the said piston rod, a clamping member carried by the said swingable rod, and a guide for the said rod causing the same to move in such a manner that the clamping member will exert a pulling action on the teat while pressing thereon, substantially as and for the purpose set forth.

3. In a milking machine, the combination of a teat cup, a reciprocating part placed outside the said teat cup, a rod swingably connected to the said reciprocating part, a clamping member carried by the said rod within the said teat cup, and a guiding sleeve placed in the wall of the said teat cup and surrounding the said rod, said sleeve being adapted to swing vertically in the wall of the teat cup, substantially as and for the purpose set forth.

4. In a milking machine, the combination of a teat cup, a reciprocating part placed outside the said teat cup, a rod swingably connected to the said reciprocating part, a clamping member carried by the said rod within the said teat cup, a guiding sleeve placed in the wall of the said teat cup and surrounding the said rod, said sleeve being adapted to swing vertically in the wall of the teat cup, and means acting to normally keep the clamping member in a raised position, substantially as and for the purpose set forth.

5. In a milking machine, the combination of a teat cup, a reciprocating part placed outside the said teat cup, a rod swingably connected to the said reciprocating part, a clamping member carried by the said rod within the said teat cup, a guiding sleeve placed in the wall of the said teat cup and surrounding the said rod, said sleeve being adapted to swing vertically in the wall of the teat cup, and a spring acting to turn the said sleeve in such a direction as to raise the clamping member, substantially as and for the purpose set forth.

6. In a milking machine, the combination of a cross bar, a sleeve surrounding the said cross-bar in such a manner as to be able to turn about the same, a second sleeve connected to the former in such a manner as to be able to swing laterally, a rod passing through the said latter sleeve, a teat cup carried by the said rod, means for supporting the said rod in such a manner as to keep the teat cup pressed against the udder, a reciprocating part placed outside the said teat cup, a rod swingably connected to the said reciprocating part, a clamping member carried by the said rod within the teat cup, and a guiding sleeve placed in the wall of the said teat cup and surrounding the said rod, said sleeve being adapted to swing vertically in the wall of the teat cup, substantially as and for the purpose set forth.

7. In a milking machine, the combination of a cross bar, a sleeve surrounding the said cross-bar in such a manner as to be able to turn about the same, a second sleeve connected to the former in such a manner as to be able to swing laterally, a rod passing through the said latter sleeve, a teat cup carried by the said rod, a vertically swingable bar supporting the said rod, means for keeping the said bar and thereby the rod in a position in which the teat cup is pressed against the udder, a reciprocating part placed outside the said teat cup, a rod swingably connected to the said reciprocating part, a clamping member carried by the said rod within the teat cup, and a guiding sleeve placed in the wall of the said teat cup and surrounding the said rod, said sleeve being adapted to swing vertically in the wall of the teat cup, substantially as and for the purpose set forth.

8. In a milking machine, the combination of a cross bar, a sleeve surrounding the said cross-bar in such a manner as to be able to turn about the same, a second sleeve connected to the former in such a manner as to be able to swing laterally, a rod passing through the said latter sleeve, a teat cup carried by the said rod, a sleeve adjustable in position along the said rod, means for securing the said sleeve in position on the said rod, an elastically supported swingable bar connected to the said sleeve for keeping the said rod pressed upward and thereby the teat cup pressed against the udder, a reciprocating part placed outside the said teat cup, a rod swingably connected to the said reciprocating part, a clamping member carried by the said rod within the teat cup, and a guiding sleeve placed in the wall of the said teat cup and surrounding the said rod, said sleeve being adapted to swing vertically in the wall of the teat cup, substantially as and for the purpose set forth.

FRANS JOSEF JOHANSSON.
EMIL ALBERT OLSON GÖTHE.

Witnesses:
K. E. WIBERG,
HANS DAHLQVIST.